United States Patent
Hamilton, II et al.

(10) Patent No.: US 7,139,972 B2
(45) Date of Patent: Nov. 21, 2006

(54) PREEMPTIVE DOWNLOADING OF WEB PAGES WITH TERMS ASSOCIATED WITH USER INTEREST KEYWORDS

(75) Inventors: Rick Allen Hamilton, II, Charlottesville, VA (US); Steven Jay Lipton, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 848 days.

(21) Appl. No.: 09/915,433

(22) Filed: Jul. 26, 2001

(65) Prior Publication Data

US 2003/0023629 A1    Jan. 30, 2003

(51) Int. Cl.
*G06F 15/00* (2006.01)

(52) U.S. Cl. .................. 715/513; 715/501.1; 707/2; 707/5

(58) Field of Classification Search ........... 715/501.1, 715/513; 707/2, 3, 4, 5
See application file for complete search history.

(56) References Cited

U.S. PATENT DOCUMENTS

| | | | |
|---|---|---|---|
| 5,941,944 A | 8/1999 | Messerly | 709/203 |
| 5,999,929 A | 12/1999 | Goodman | 707/7 |
| 6,012,053 A * | 1/2000 | Pant et al. | 707/3 |
| 6,182,072 B1 | 1/2001 | Leak et al. | 707/10 |
| 6,182,097 B1 | 1/2001 | Hansen et al. | 707/526 |
| 6,185,614 B1 | 2/2001 | Cuomo et al. | 709/224 |
| 6,285,999 B1 * | 9/2001 | Page | 707/5 |
| 6,457,028 B1 | 9/2002 | Pitkow et al. | 715/513 |
| 6,490,577 B1 * | 12/2002 | Anwar | 707/3 |
| 6,564,208 B1 * | 5/2003 | Littlefield et al. | 707/3 |
| 6,754,873 B1 * | 6/2004 | Law et al. | 715/501.1 |
| 2002/0129014 A1 * | 9/2002 | Kim et al. | 707/5 |
| 2002/0198875 A1 * | 12/2002 | Masters | 707/4 |

OTHER PUBLICATIONS

Optimal Crawling Strategies for Web Search Engines, by Wolf et al. Published May 7-11, 2002 whole document.*

* cited by examiner

*Primary Examiner*—William Bashore
*Assistant Examiner*—Quoc A. Tran
(74) *Attorney, Agent, or Firm*—Duke W. Yee; David A. Mims, Jr.; Gerald H. Glanzman

(57) ABSTRACT

The present invention provides a method, apparatus, and computer implemented instructions for preemptive downloading and highlighting of web pages with terms indirectly associated with user interest keywords. Associative terms are identified and weighted. The weighted associative terms are used to rate Web pages. The Web pages, which have a rating higher than the specified threshold, are selected and presented to the user. Also, Web pages that contain user interest keywords or subject matter keywords from the currently displayed Web page are selected and presented to the user.

16 Claims, 7 Drawing Sheets

PREEMPTIVE DOWNLOADING OF WEB PAGES WITH TERMS ASSOCIATED WITH USER INTEREST KEYWORDS

BACKGROUND OF THE INVENTION

1. Technical Field

The present invention relates generally to an improved data processing system. Still more particularly, the present invention relates to the preemptive downloading and highlighting of Web pages based on determination criteria.

2. Description of Related Art

The Internet, also referred to as an "internetwork", is a set of computer networks, possibly dissimilar, joined together by means of gateways that handle data transfer and the conversion of messages from protocols of the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies, which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

The Internet also is widely used to transfer applications to users using browsers. With respect to commerce on the Web, individual consumers and businesses use the Web to purchase various goods and services. In offering goods and services, some companies offer goods and services solely on the Web while others use the Web to extend their reach. Many sources of information are available on the Web. The demand and need to gather information quickly is increasing as technology advances. Web browsers with the use of various commercial search engines are used to research information on virtually any topic. Web browsers require the user to manually search for any articles or documents of interest. Many Web pages or documents may need to be downloaded before one of interest is found. It can be time consuming and cumbersome to search for multiple Web pages and documents that interest the user. As processor speeds, bandwidths, and desktop computers increase, the development of better and more efficient ways to deliver and filter user pertinent information to the desktop is desired.

Therefore, it would be advantageous to have an improved method, apparatus, and computer instructions for searching Web pages and document of interest to the user.

SUMMARY OF THE INVENTION

The present invention provides a method, apparatus, and computer implemented instructions for preemptive downloading and highlighting of Web pages with terms indirectly associated with user interest keywords. Associative terms are identified and weighted. The weighted associative terms are used to rate Web pages. The Web pages, which have a rating higher than the specified threshold, are selected and presented to the user. Also, Web pages that contain user interest keywords or subject matter keywords from the currently displayed Web page are selected and presented to the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
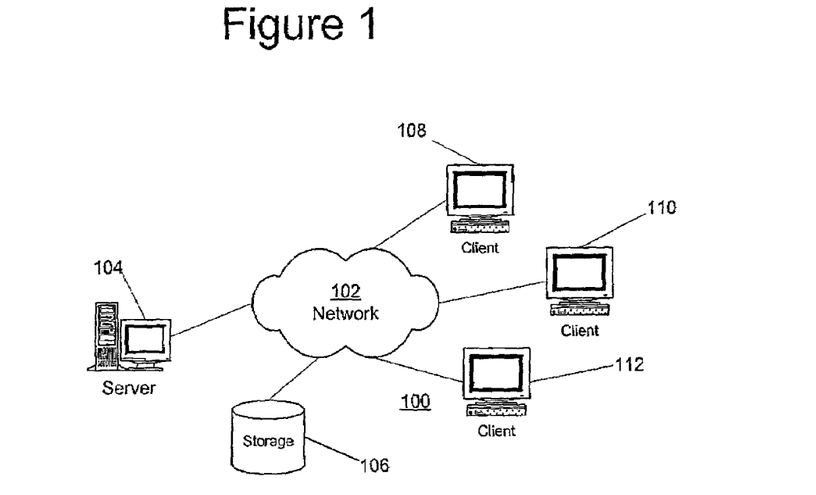
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, Web pages and applications to clients 108–112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
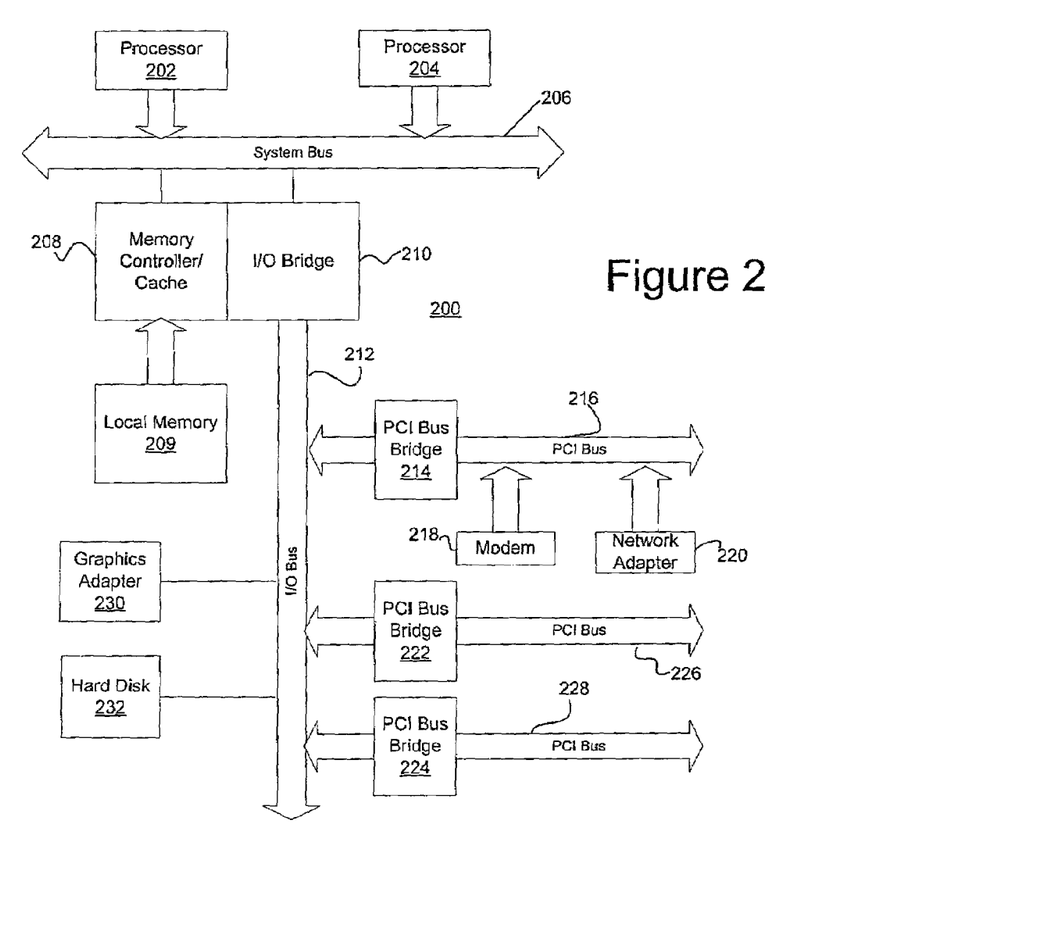
FIG. 2 is a block diagram of a data processing system that may be implemented as a server in which the present invention may be implemented.

Referring to FIG. 2, a block diagram of a data processing system that may be implemented as a server, such as server 104 in FIG. 1, is depicted in accordance with a preferred embodiment of the present invention. The processes of the present invention for identifying Web pages may be implemented in a server.

Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
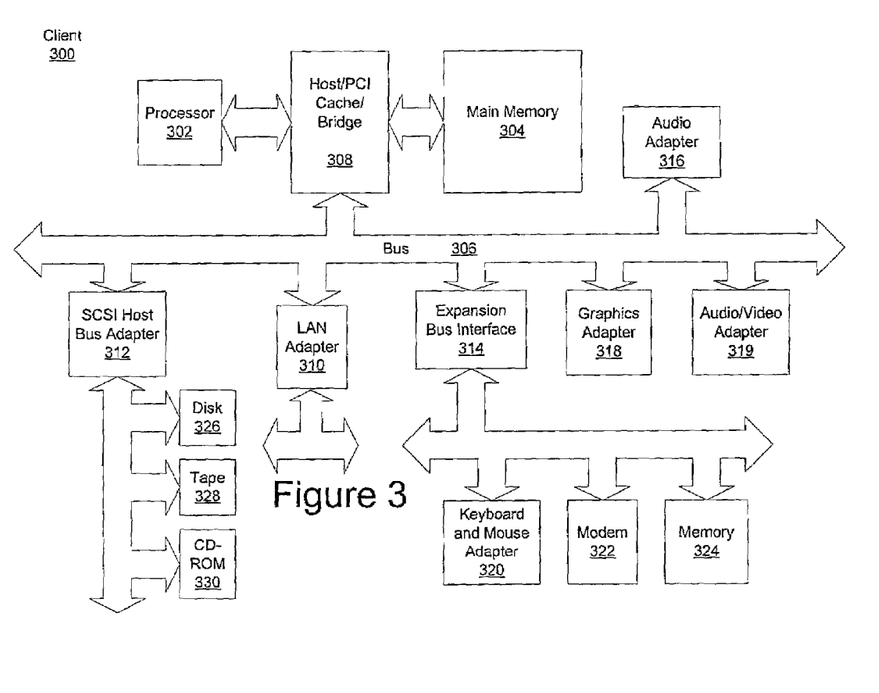
FIG. 3 is a block diagram illustrating a data processing system in which the present invention may be implemented.

The data processing system depicted in FIG. 2 may be, for example, an IBM e-Server pSeries system, a product of International Business Machines Corporation in Armonk, N.Y. , running the Advanced Interactive Executive (AIX) operating system or LINUX operating system. With reference now to FIG. 3, a block diagram illustrating a data processing system is depicted in which the present invention may be implemented. Data processing system 300 is an example of a client computer. The processes of the present invention for identifying Web pages may be implemented within a client, such as data processing system 300.

In this example, data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a personal digital assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
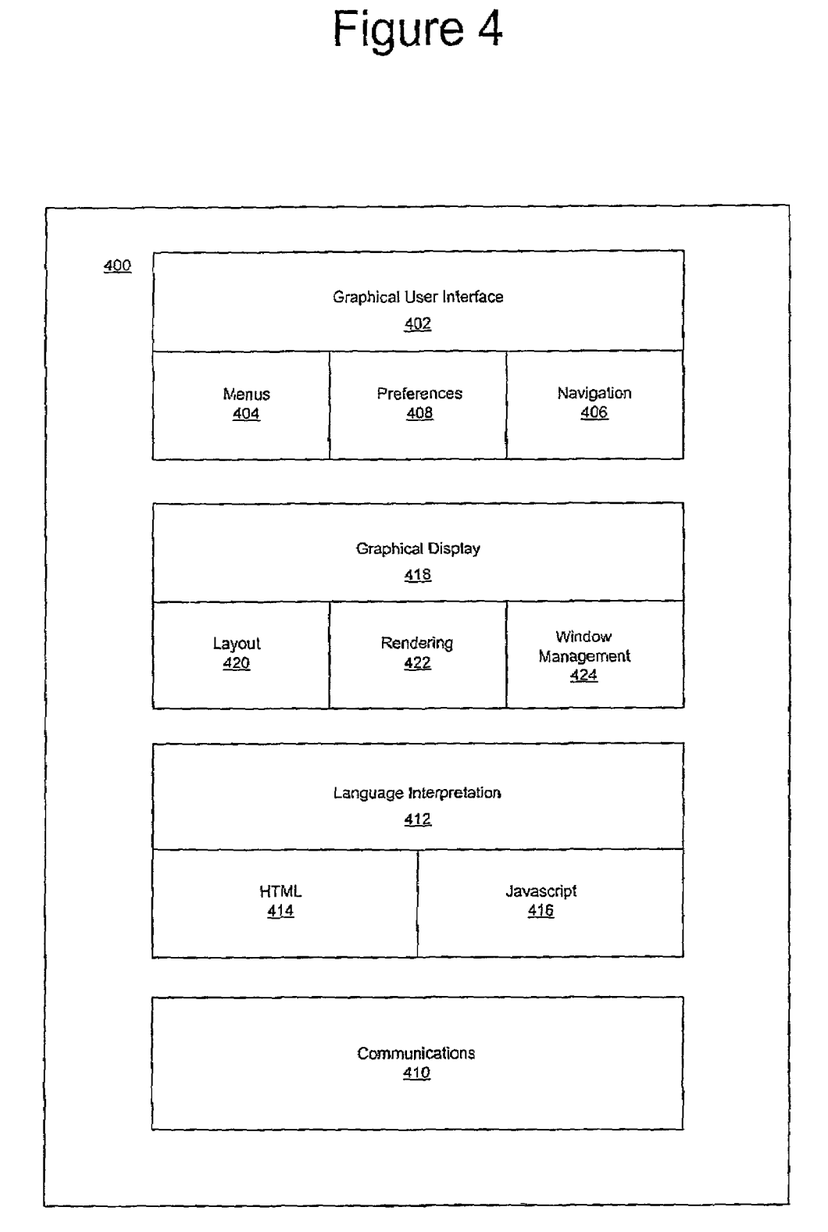
FIG. 4 is a block diagram of a browser program in accordance with a preferred embodiment of the present invention.

Turning next to FIG. 4, a block diagram of a browser program is depicted in accordance with a preferred embodiment of the present invention. A browser is an application used to navigate or view information or data in a distributed database, such as the Internet or the World Wide Web. When implemented in a client, the processes of the present invention may be located in a program such as browser 400.

In this example, browser 400 includes a user interface 402, which is a graphical user interface (GUI) that allows the user to interface or communicate with browser 400. This interface provides for selection of various functions through menus 404 and allows for navigation through navigation 406. For example, menu 404 may allow a user to perform various functions, such as saving a file, opening a new window, displaying a history, and entering a URL. Navigation 406 allows for a user to navigate various pages and to select web sites for viewing. For example, navigation 406 may allow a user to see a previous page or a subsequent page relative to the present page. Preferences such as those illustrated in FIG. 4 may be set through preferences 408.

Communications 410 is the mechanism with which browser 400 receives documents and other resources from a network such as the Internet. Further, communications 410 is used to send or upload documents and resources onto a network. In the depicted example, communication 410 uses HTTP. Other protocols may be used depending on the implementation. Documents that are received by browser 400 are processed by language interpretation 412, which includes an HTML unit 414 and a JavaScript unit 416. Language interpretation 412 will process a document for presentation on graphical display 418. In particular, HTML statements are processed by HTML unit 414 for presentation while JavaScript statements are processed by JavaScript unit 416.

Graphical display 418 includes layout unit 420, rendering unit 422, and window management 424. These units are involved in presenting web pages to a user based on results from language interpretation 412.

Browser 400 is presented as an example of a browser program in which the present invention may be embodied. Browser 400 is not meant to imply architectural limitations to the present invention. Presently available browsers may include additional functions not shown or may omit functions shown in browser 400. A browser may be any application that is used to search for and display content on a distributed data processing system. Browser 400 make be implemented using know browser applications, such Netscape Navigator or Microsoft Internet Explorer.

Netscape Navigator is available from Netscape Communications Corporation while Microsoft Internet Explorer is available from Microsoft Corporation.

Figure 5:
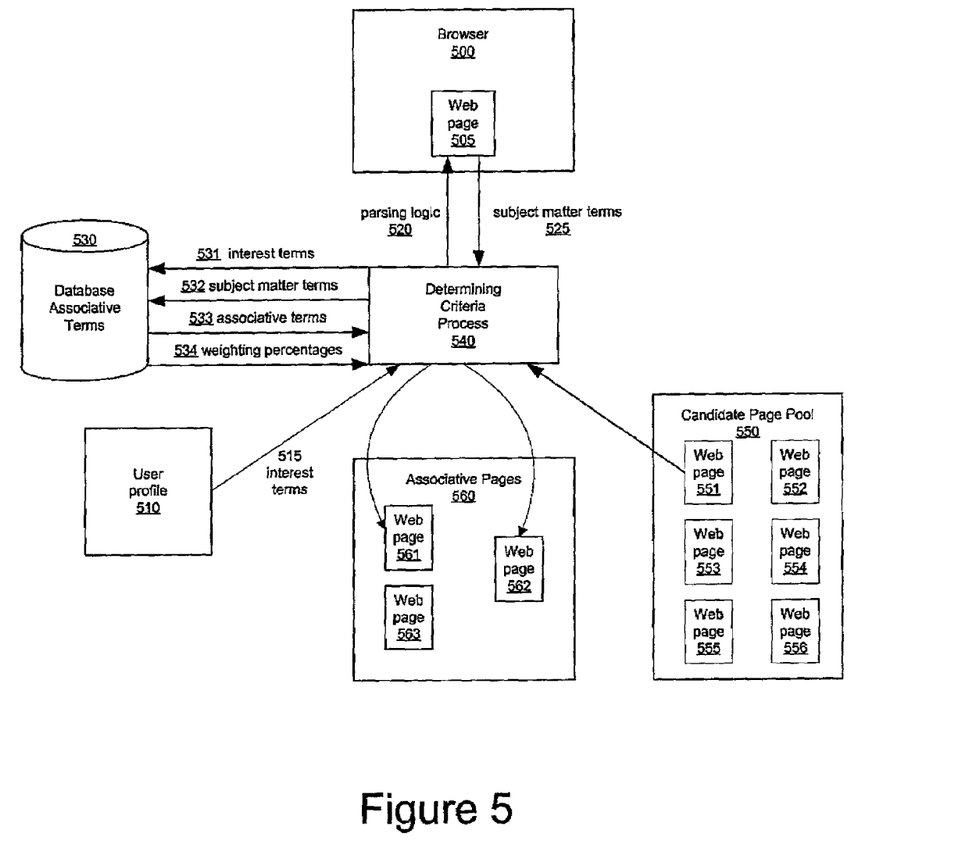
FIG. 5 is a block diagram of the determining criteria process in accordance with a preferred embodiment of the present invention.

Next, FIG. 5, a block diagram of the determining criteria process is depicted in accordance with a preferred embodiment of the present invention. Browser 500 is used to display Web pages or documents, such as Web page 505. User profile 510 contains interest terms 515. Interest terms 515 are words or terms obtained from a user. These terms are words, such as keywords, defined by the user in searching for Web pages or other documents.

Parsing logic 520 is used to gather subject matter terms 525 from the current Web page or document displayed by a client, such as client 300 in FIG. 3. Subject matter terms 525 are terms that are related to the subject matter of a Web page or document. Interest terms 531 and subject matter terms 532 are used to select associative terms 533 and weighting percentages 534 from database 530 which are used by determining criteria process 540 to evaluate Web pages or documents from candidate page pool 550. Web pages 551, 552, 553, 554, 555, and 556 are located in candidate page pool 550 and are evaluated for the probability that the page or document is of interest to the user. Candidate page pool 550 is a collection of Web pages or documents from a variety of sources, which will be considered for possible association to the interest of the user. Web pages or documents from the candidate page pool, referred to as "candidate pages", are rated and the candidate pages with a rating that exceeds a given threshold are promoted to associative pages 560 are identified as Web pages 561, 562, and 563. An associative page is defined as a page or document that is deemed to be related to an interest term, whether or not the interest term is explicitly mentioned on the page.

Candidate pages may be promoted to associative pages based on the weighting principals of determining criteria process 540. Probability of Associative Weighting ($P_{aw}$) is the percentage chance that an article containing certain associative terms may actually be relevant to a given interest keyword. A cumulative rating ($P_{cumulative}$) assigned to an article is based upon certain associative terms with individual $P_{aw}$ values. Threshold probability ($P_{threshold}$) is the decision threshold stipulating that a given article is germane to a user's interests, based upon the presence of keywords or interest terms found within it.

Terms, such as associative terms 533, may be assigned weighting percentages, which indicate their probability of a match with specific interest terms. These associative terms may have an assigned weighting percentage or $P_{aw}$ that an article containing them may be relevant to the specific interest term. An example of an interest term and $P_{aw}$ percentage for the term "wine" may be the term "vintner" with a $P_{aw}$ of 95 percent. Locating the associative term "pinot noir" within a candidate page could similarly represent a $P_{aw}$ of 95 percent. Although, locating the associative term "Bordeaux" within a candidate page may represent a $P_{aw}$ of only 60 percent since it refers to a geographical region and not necessarily a wine. If one or more associative terms are located in the candidate page, a cumulative rating or $P_{cumulative}$ is given to the candidate page based on the weighting percentages or $P_{aw}$ assigned to the associative terms.

If multiple associative terms are located in the candidate page, the percentage chance will increase due to the cumulative rating or $P_{cumulative}$ assigned to the candidate page based on the weighting percentage for each of the located associative terms. For example, an interest term of "baseball" may have the associative terms, in this example, "bases", "pitcher", and "catcher". If the candidate page contains the term "pitcher", the percentage may only be of a 50 percent interest to the user, but if the candidate page contained the associative terms "pitcher", "catcher", and "bases" the percentage of interest to the user may increase to 95 percent.

A decision threshold or $P_{threshold}$ is used to stipulate whether or not a candidate page may be promoted to an associative page. If the cumulative rating or $P_{cumulative}$ of the candidate page is greater than the decision threshold or $P_{threshold}$, the candidate page is promoted to associative page.

The different functional components illustrated in FIG. 5 may be found in different locations depending on the particular implementation. For example, determining process criteria 540 may be part of browser 500 or a plug-in for browser 500. Alternatively, this component may be located on a server, such as server 104 in FIG. 1.

Figure 6:
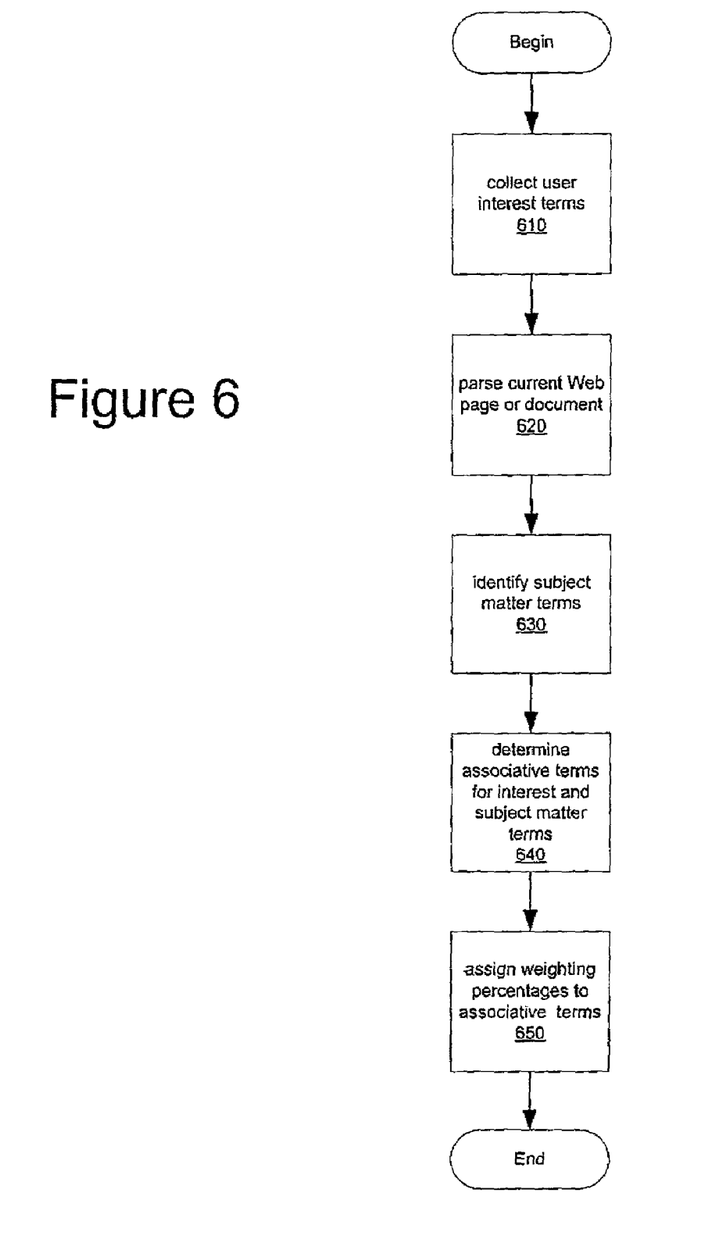
FIG. 6 is a flowchart of the process to identify and weight associative terms in accordance with a preferred embodiment of the present invention.

Turning next to FIG. 6, a flowchart of the process to identify and weight associative terms is depicted in accordance with a preferred embodiment of the present invention. The process illustrated in FIG. 6 may be implemented in a data processing system, such as data processing system 300 in FIG. 3. Alternatively, the process may be implemented in a server, such as server 104 in FIG. 4.

User profile 510 in FIG. 5 may contain user interest terms. Interest terms, defined by the user, are collected (step 610). These terms may be collected from a profile, such as user profile 510 in FIG. 5. The current Web page or document being viewed by the user is parsed (step 620). When implemented in a server, this Web page may be retrieved from a client or may be a Web page sent from the server to the client, such as a proxy server.

Next, subject matter terms, such as subject matter terms 525 in FIG. 5, are identified and collected from the parsed page or document (step 630). These subject matter terms may be determined by a comparison of terms within a page with a master list of terms. Associative terms are identified based on the previously collected interest terms and subject matter terms (step 640). A database, such as database 530 in FIG. 5, could be searched for interest terms and subject matter terms to find corresponding associative terms. Weighting percentages or $P_{aw}$ are assigned to the associative terms based on specified probabilities that the associative term is relative to the interest terms or subject matter terms (step 650) with the process terminating thereafter.

Figure 7:
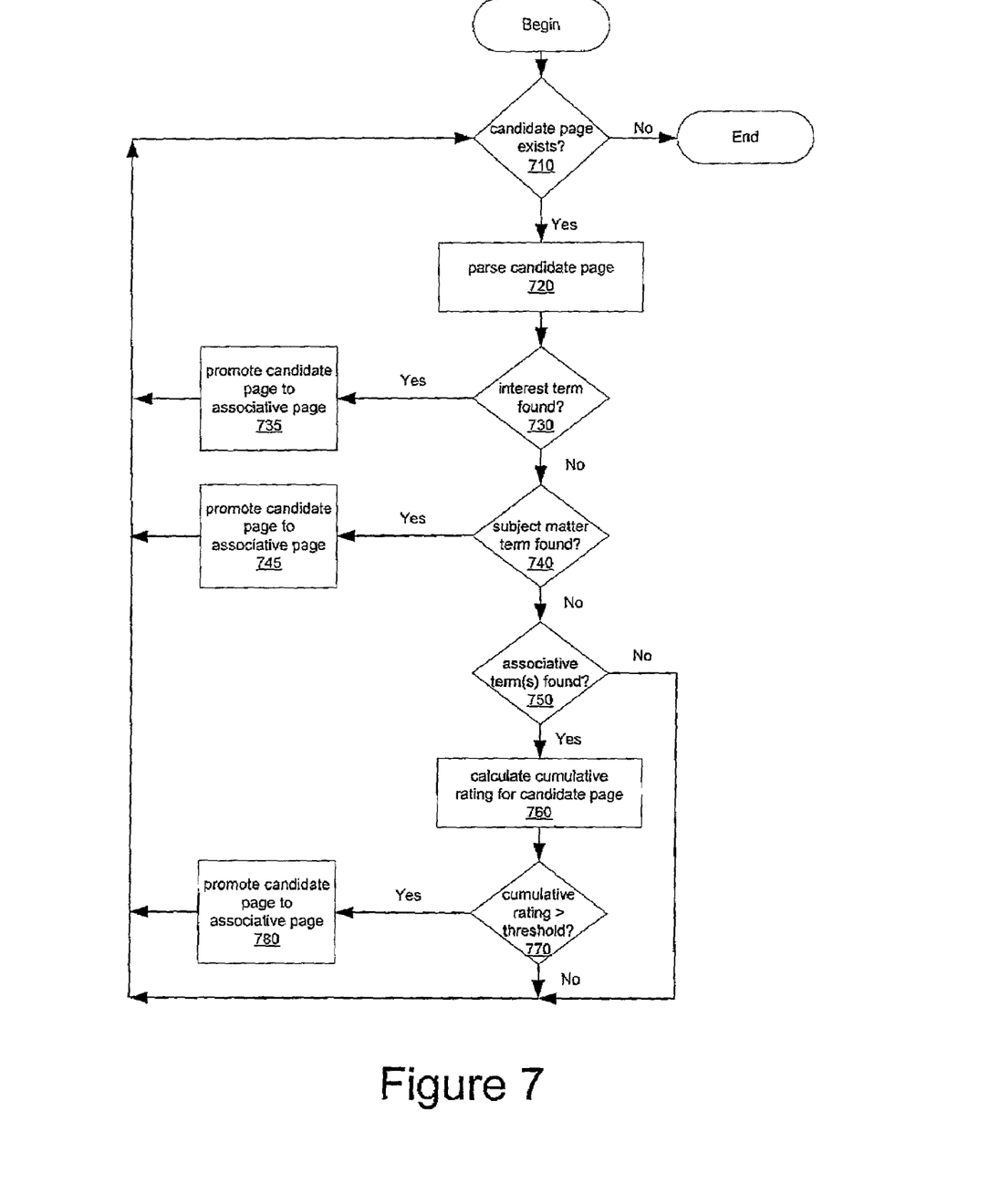
FIG. 7 is a flowchart of the process to promote candidate pages to associative pages in accordance with a preferred embodiment of the present invention.

Turning to the next flowchart, FIG. 7, a flowchart of the process to promote candidate pages to associative pages is depicted in accordance with a preferred embodiment of the present invention. The process illustrated in FIG. 6 may be implemented in a data processing system, such as data processing system 300 in FIG. 3. In a client, the process may be implemented in a browser or as a plug-in to a browser. Alternatively, the process may be implemented in a server, such as server 104 in FIG. 4.

A determination is made as to whether a candidate page exists (step 710). If a candidate page exists, the candidate page is parsed (step 720). Next, a determination is made as to whether an interest term is found in the candidate page (step 730). If an interest term is found, the candidate page is promoted to an associative page (step 735) with the process then returning to step 710 as described above. If an interest term is not found, a determination is made as to whether a subject matter term is found in the candidate page (step 740). If a subject matter term is found, the candidate page is promoted to an associative page (step 745) with the process then returning to step 710 as described above.

Turning back to step 740, if a subject matter term is not found, a determination is made as to whether one or more associative terms are found in the candidate page (step 750). If one or more associative terms are not found, the process returns to step 710 as described above. If one or more associative terms are found, a cumulative rating or $P_{cumulative}$ is calculated based on the associative terms found in the candidate page (step 760). The candidate pages are evaluated with respect to the weighting principles of the present invention. For example, consider the probability of two coin flips coming up heads is equal to the probability of the first event occurring times the probability of the second event occurring. The probability of the first event is 50 percent and the probability of the second event is 50 percent; therefore, the probability of two coin flips coming up heads is 25 percent. When determining the probability of at least one flip coming up heads, the calculation would be the complete set of possibilities or 100 percent minus the probability of the event not occurring. The probability of the event not occurring is the probability of two tails events or 25 percent, which is the same probability as the two heads events described previously. The probability of at least one heads event occurring in two flips of a coin is 100 percent minus 25 percent or 75 percent.

Consider another example of a specially weighted coin, in which the probability of a heads event is 60 percent. In this case, the probability of two heads events is the product of the probabilities of the two events occurring separately, or 36 percent. The probability of at least one flip coming up heads is again given by 100 percent minus the probability of two tails events. The probability of two tails events occurring is 40 percent times 40 percent or 16 percent. Therefore, the probability of at least one heads event in two flips is 100 percent minus 16 percent or 84 percent.

These statistical concepts are used in the generation of the $P_{cumulative}$ values. The probability of a candidate page being relative to the interests of the user is one minus the probability that it is irrelevant. Consider the previously mentioned "wine" example with its given $P_{aw}$ values. It may be stated that the relevance of a candidate page which does not contain the term "wine", but contains the associative terms "vintner" and "Bordeaux" would be given the $P_{cumulative}$ value of $[1-(1-0.95)(1-0.6)]$ or 98 percent.

A determination is then made as to whether the cumulative rating or $P_{cumulative}$ of the candidate page is greater than the determination threshold or $P_{threshold}$ (step 770). The process for setting the determination threshold could be the result of various methods. The threshold could be the stated preferences of the end-user or an arbitrary value set by the Internet Service Provider (ISP). Another method could be to calculate a value as a result of sampling end-user actual usage of the World Wide Web. If the cumulative rating or $P_{cumulative}$ of the candidate page is greater than the determination threshold or $P_{threshold}$, the candidate pages, which have a rating greater than the specified determination threshold, are promoted to associative pages (step 780) with the process then returning to step 710 as described above. If a $P_{threshold}$ value of 96 percent is specified, for example, then the candidate page in the previously discussed "wine" example would be promoted to an associative page since the $P_{cumulative}$ value of 98 percent is greater. If the rating is not greater than the threshold, the process also returns to step 710 above. In step 710, the process ends when no further candidate pages are identified.

Figure 8:
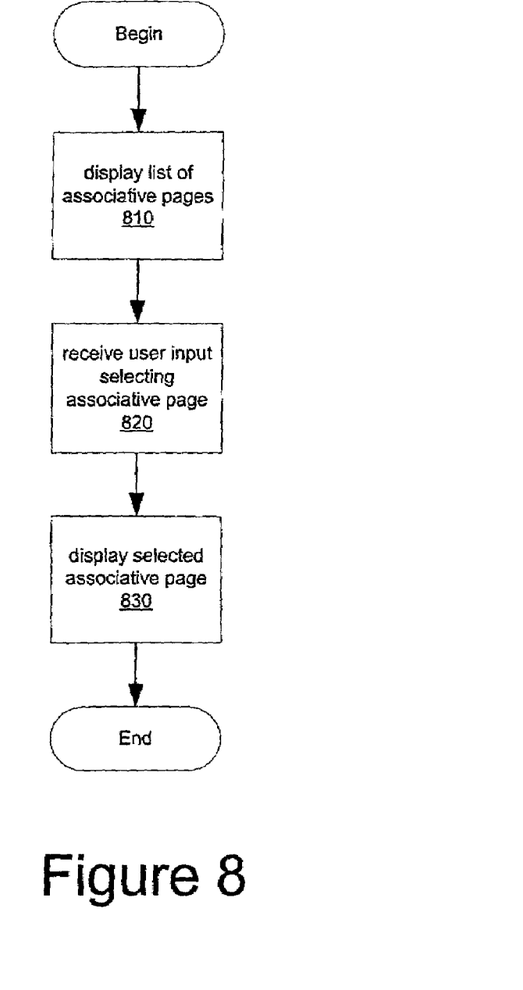
FIG. 8 is a flowchart of the process to display selected associative pages in accordance with a preferred embodiment of the present invention.

FIG. 8 is a flowchart of the process to display selected associative pages in accordance with a preferred embodiment of the present invention. The process illustrated in FIG.

8 may be implemented in a data processing system such as data processing system 300 in FIG. 3.

Once a set of candidate pages from the candidate page pool are promoted to associative pages, a list of the associative pages may be displayed (step 810). User input is received selecting an associative page from the list of associative pages (step 820). The selected associative page would then be displayed to the user (step 830) with the process terminating thereafter. The associative page may be displayed with the use of a browser, such as browser 400 in FIG. 4.

Thus, the present invention provides an improved method, apparatus, and computer implemented instructions for aiding a user in identifying Web pages or other content of interest. The mechanism of the present invention employs weighting mechanisms to provide for more intelligent searches to occur. In addition to searching for content containing interest terms or key words, the mechanism of the present invention searches for content containing terms related to these interest terms.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for selecting a Web page, the method comprising:
   receiving at least one user interest term;
   identifying associative terms, wherein the associative terms are associated with the at least one user interest term;
   weighting the associative terms in response to an identification of the associative terms to form a set of weighted associative terms based on specified probabilities that the associative terms are relative to the at least one user interest term;
   processing a plurality of Web pages using the set of weighted associative terms to generate a plurality of cumulative ratings in which each Web page within the plurality of Web pages has a cumulative rating, wherein the cumulative rating for a particular Web page within the plurality of Web pages is based on the set of weighted associative terms, wherein the cumulative rating of the particular Web page is 100 percent minus the probability that the particular Web page is irrelevant, and wherein the probability that the particular Web page is irrelevant is determined by multiplying differences between 100 percent and each of the set of weighted associative terms;
   selecting the Web page as a Web page having a selected cumulative rating greater than a threshold; and
   presenting the Web page.

2. The method of claim 1 further comprising:
   selecting another Web page from the plurality of Web pages if the another Web page has a cumulative rating greater than the threshold.

3. The method of claim 1, wherein the method is implemented in a browser program.

4. The method of claim 1, wherein the data structure is a database.

5. The method of claim 1, further comprising:
   identifying additional associative terms using parsing logic, wherein the additional associative terms are associated with at least one subject matter term gathered from a displayed Web page selected by a user.

6. A method in a data processing system for processing documents, the method comprising:
   assigning weights to a set of terms, wherein the set of terms is associated with at least one particular term of interest and wherein each term within the set of terms is associated with a weight to form a weighted set of terms based on specified probabilities that the set of terms is relative to the at least one particular term of interest;
   selecting a document from a group of documents using the weighted set of terms; and
   wherein the selecting step comprises:
   generating a cumulative weight for each document within the group of documents, wherein the cumulative weight is 100 percent minus the probability that a particular document is irrelevant, and wherein the probability that a particular document is irrelevant is determined by multiplying differences between 100 percent and the weights for each term within the weighted set of terms;
   comparing the cumulative weight for each document with a threshold;
   selecting the document as a selected document having a weight cumulative weight greater than the threshold; and
   presenting the document.

7. A data processing system comprising:
   a bus system;
   a communications unit connected to the bus system;
   a memory connected to the bus system, wherein the memory includes a set of instructions; and
   a processing unit connected to the bus system, wherein the processing unit executes the set of instructions to receive at least one user interest term; identify associative terms, wherein the associative terms are associated with the at least one user interest term; weigh the associative terms in response to an identification of the associative terms to form a set of weighted associative terms based on specified probabilities that the associative terms are relative to the at least one user interest term; processing a plurality of Web pages using the set of weighted associative terms to generate a plurality of cumulative ratings in which each Web page within the plurality of Web pages has a cumulative rating, wherein the cumulative rating fort particular Web page within the plurality of Web pages is based on the set of weighted associative terms; wherein the cumulative rating of the particular Web page is 100 percent minus the probability that the particular Web page is irrelevant, and wherein the probability that the particular Web page is irrelevant is determined by multiplying differences between 100 percent and each of the set of weighted associative terms; and select the Web page as a Web page having a selected cumulative rating greater than a threshold.

8. A data processing system comprising:
a bus system;
a communications unit connected to the bus system;
a memory connected to the bus system, wherein the memory includes a set of instructions; and
a processing unit connected to the bus system, wherein the processing unit executes the set of instructions to assign weights to a set of terms, wherein the set of terms is associated with at least one particular term of interest and wherein each term within the set of terms is associated with a weight to form a weighted set of terms based on specified probabilities that the set of terms is relative to the at least one particular term of interest; select a document from a group of documents using the weighted set of terms; generate a cumulative weight for each document within the group of documents, wherein the cumulative weight is 100 percent minus the probability that a particular document is irrelevant, and wherein the probability that a particular document is irrelevant is determined by multiplying differences between 100 percent and the weights for each term within the weighted set of terms; compare the cumulative weight for each document with a threshold; and select the document as a selected document having a weight cumulative weight greater than the threshold.

9. A data processing system for selecting a Web page, the data processing system comprising:
receiving means receiving at least one user interest term;
identifying means identifying associative terms, wherein the associative terms are associated with the at least one user interest term;
weighting means weighting the associative terms in response to an identification of the associative terms to form a set of weighted associative terms based on specified probabilities that the associative terms are relative to the at least one user interest term;
processing means processing a plurality of Web pages using the set of weighted associative terms to generate a plurality of cumulative ratings in which each Web page within the plurality of Web pages has a cumulative rating, wherein the cumulative rating for a particular Web page within the plurality of Web pages is based on the set of weighted associative terms, wherein the cumulative rating of the particular Web page is 100 percent minus the probability that the particular Web page is irrelevant, and wherein the probability that the particular Web page is irrelevant is determined by multiplying differences between 100 percent and each of the set of weighted associative terms;
selecting means selecting the Web page as a Web page having a selected cumulative rating greater than a threshold; and
presenting means for presenting the Web page.

10. The data processing system of claim 9, wherein the selecting means is a first selecting means and further comprising:

second selecting means for selecting another Web page from the plurality of Web pages if the another Web page has a cumulative rating greater than the threshold.

11. The data processing system of claim 9, wherein the identifying means, weighting means, processing means, and selecting means are located in a browser program.

12. The data processing system of claim 9, wherein the data structure is a database.

13. The data processing system of claim 9 further comprising:
wherein the identifying means identifies additional associative terms using parsing logic, wherein the additional associative terms are associated with at least one subject matter term gathered from a displayed Web page selected by a user.

14. A data processing system for processing documents, the data processing system comprising:
assigning means assigning weights to a set of terms, wherein the set of terms is associated with at least one particular term of interest end wherein each term within the set of terms is associated with a weight to form a weighted set of terms based on specified probabilities that the set of terms is relative to the at least one particular term of interest;
selecting means selecting a document from a group of documents using the weighted set of terms; and
wherein the selecting means comprises:
generating means for generating a cumulative weight for each document within the group of documents, wherein the cumulative weight is 100 percent minus the probability that a particular document is irrelevant, and wherein the probability that a particular document is irrelevant is determined by multiplying differences between 100 percent and the weights for each term within the weighted set of terms;
comparing means for comparing the cumulative weight for each document with a threshold;
means for selecting the document as a selected document having a weight cumulative weight greater than the threshold; and
presenting means for presenting the document.

15. A computer program product in a computer readable medium for selecting a Web page, the computer program product comprising:
first instructions for receiving at least one user interest term;
second instructions for identifying associative terms, wherein the associative terms are associated with the at least one user interest term;
third instructions for weighting the associative terms in response to an identification of the associative terms to form a set of weighted associative terms based on specified probabilities that the associative terms are relative to at least one user interest term;
fourth instructions for processing a plurality of Web pages using the set of weighted associative terms to generate a plurality of cumulative ratings in which each Web page within the plurality of Web pages has a cumulative rating, wherein the cumulative rating for a particular Web page within the plurality of Web pages is based on the set of weighted associative terms, wherein the cumulative rating of the particular Web page is 100 percent minus the probability that the particular Web page is irrelevant, and wherein, the probability that the particular Web page is irrelevant is determined by multiplying differences between 100 percent and each of the set of weighted associative terms;

fifth instructions for selecting the Web page as a Web page having a selected cumulative rating greater than a threshold; and sixth instruction for presenting the Web page.

16. A computer program product in a computer readable medium for processing documents, the computer program product comprising:

first instructions for assigning weights to a set of terms, wherein the set of terms is associated with at least one particular term of interest and wherein each term within the set of terms is associated with a weight to form a weighted set of terms based on specified probabilities that the set of terms is relative to the at least one particular term of interest;

second instructions for selecting a document from a group of documents using the weighted set of terms; and wherein the second instructions for selecting comprises:

third instructions for generating a cumulative weight for each document within the group of documents, wherein the cumulative weight is 100 percent minus the probability that a particular document is irrelevant, and wherein the probability that a particular document is irrelevant is determined by multiplying differences between 100 percent and the weights for each term within the weighted set of terms;

fourth instructions for comparing the cumulative weight for each document with a threshold;

fifth instructions for selecting the document as a selected document having a weight cumulative weight greater than the threshold; and sixth instructions for presenting the document.

* * * * *